Feb. 21, 1933.   G. T. RONK   1,898,395
EXCAVATOR MECHANISM
Filed Sept. 29, 1930   2 Sheets-Sheet 1

Inventor
George T. Ronk
by Orwig & Hague Att'ys

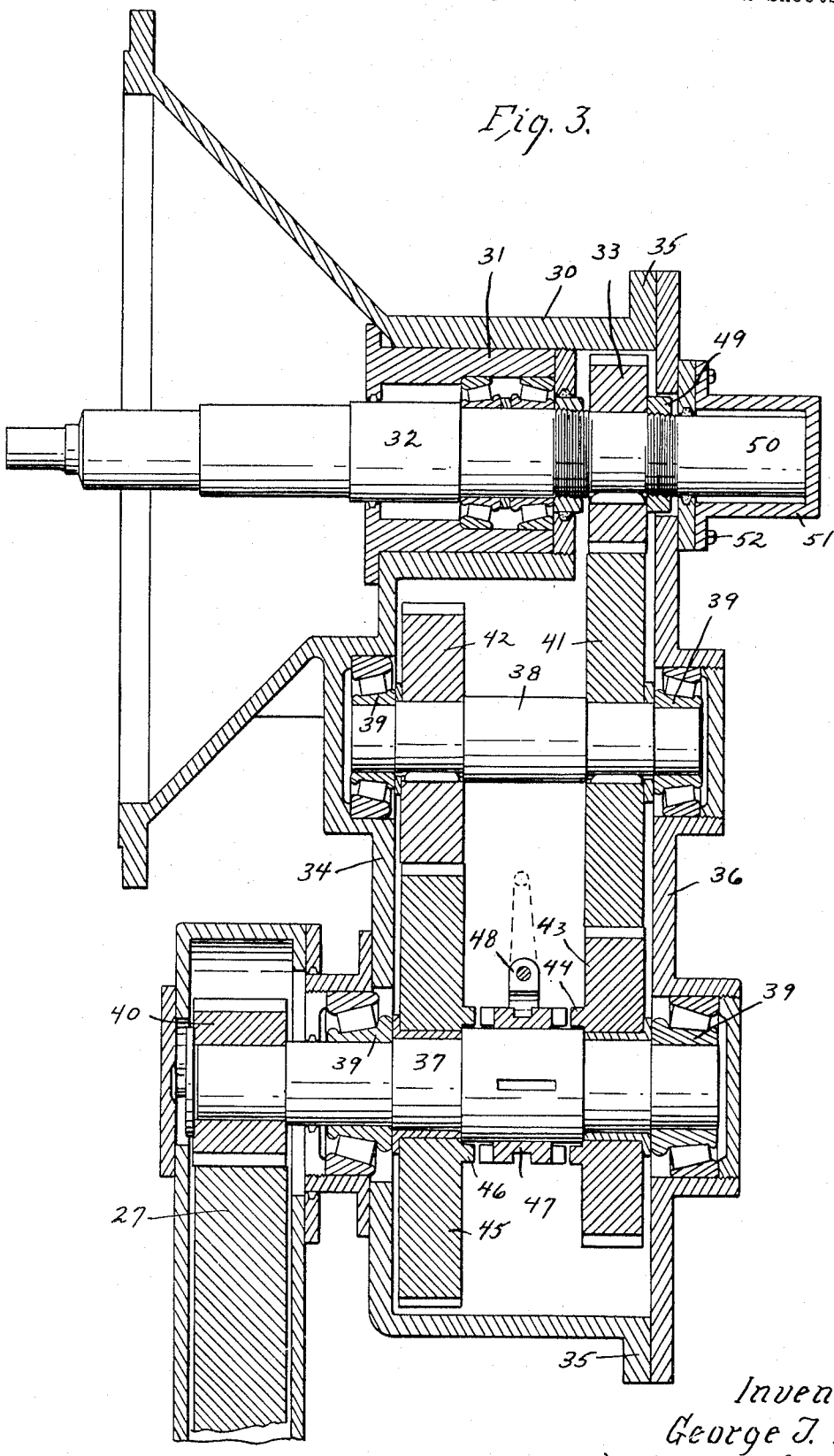

Patented Feb. 21, 1933

1,898,395

UNITED STATES PATENT OFFICE

GEORGE T. RONK, OF CEDAR RAPIDS, IOWA

EXCAVATOR MECHANISM

Application filed September 29, 1930. Serial No. 485,138.

This invention relates to improvements in that type of portable excavators having a rotatively mounted platform for supporting a boom adapted to support excavator buckets and the mechanism for elevating and lowering the free end of the boom and for controlling and operating the buckets carried thereby.

In this type of excavators the boom is pivotally mounted on one end of a platform, while the mechanism for controlling the boom and operating the buckets is supported on the central portion of the platform in such manner that the weight is evenly distributed over the pivot center for maintaining the platform in a balanced condition. The engine for operating the said mechanism is placed on the opposite end of the platform from the boom to balance the weight of the boom and the load being carried thereby in such manner that the boom, the bucket operating mechanism and the engine are usually supported in a substantially rectangular area on top of the platform, so that the weight of the platform and motor counterbalances the load on the boom with even distribution of weight on each side of a vertical plane through the pivot center of said platform, the engine and said boom.

The power is transmitted from the engine, which is usually arranged transversely of the longitudinal axis of the platform, to suitable chain or gear mechanism, said chain or gear mechanism running parallel with and adjacent to one side of the bucket operating mechanism and adjacent to one end of the engine.

The object of my invention is to provide a variable speed transmission mechanism for operatively connecting the engine with the bucket and boom operating mechanism, so supported and arranged and of compact form, whereby the said gear mechanism may assume substantially the same position of the ordinary chain or gear transmission device heretofore used, with the take-off pinion nearer the longitudinal center than has heretofore been possible in other variable speed mechanisms, and whereby the weight of the variable speed gear mechanism may be maintained as near the longitudinal center of the platform as possible for balancing purposes, and also whereby the operator may walk between the said variable speed mechanism and the side of the cab supported by the platform.

More specifically it is the object of my invention to provide in connection with the clutch casing of an internal combustion engine improved variable speed transmission gear devices wherein the variable speed transmission devices are carried by countershafts parallel with the clutch shaft, and whereby the operating gears are mounted in planes perpendicular to said clutch shaft, and in the space generally occupied by reduction gears or transmission chains, and within an area inside of the outer end of the pinion supported by said clutch shaft, so that the variable speed mechanism may be made to assume substantially the position ordinarily taken by the direct drive transmission mechanism for transmitting power from the engine to the boom and bucket operating mechanism of an excavator, with said pinion within the transmission casing, and so arranged that the said mechanism may be operated at a number of variable speeds, all of which are at a lower speed than the speed of the driving shaft operated from the engine.

A further object is to provide an improved mechanism for transmitting power from an excavator engine to the excavator mechanism operated therefrom, whereby said excavator mechanism may be thrown into and out of operative relation with the engine, and whereby said excavator mechanism may be operated at a number of speeds lower than the engine speed, said mechanism being attached without outboard bearings and additional structure for supporting the same.

My invention consists in the construction, arrangement and combination of the various parts of the device, whereby the objects contemplated are attained, as hereinafter more fully set forth, pointed out in my claim, and illustrated in the accompanying drawings, in which:

Figure 3 is an enlarged sectional view of my improved variable speed transmission mechanism taken on the line 3—3 of Figure 1.

Figure 1:
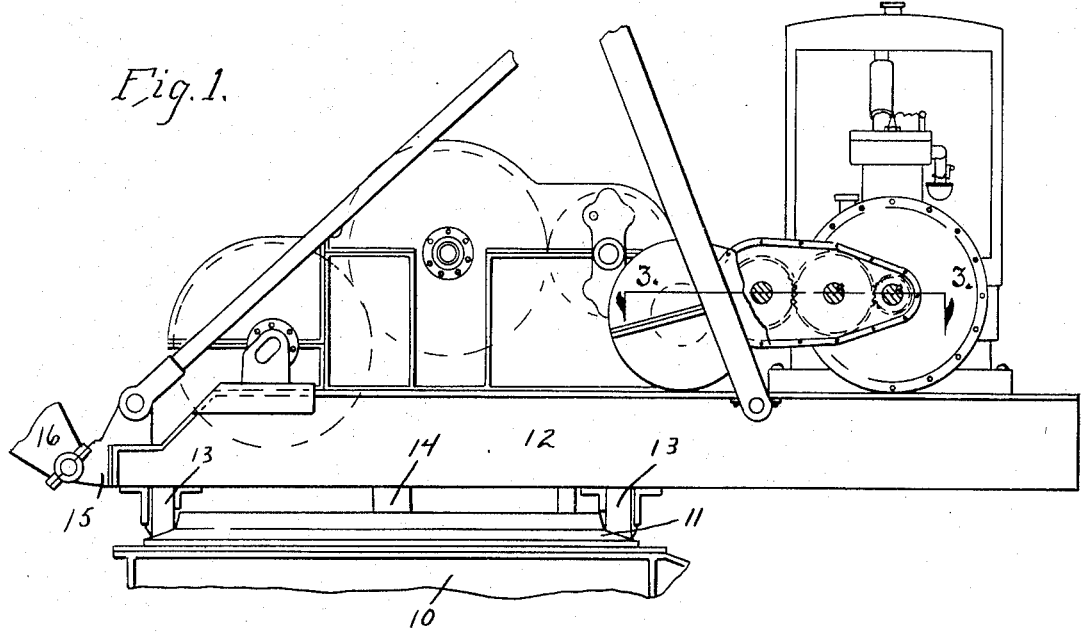
Figure 1 is a side elevation of an excavator platform showing diagrammatically the arrangement of the mechanism for controlling and operating the boom and the bucket carried thereby, and the engine for operating said mechanism, and the manner in which my improved transmission mechanism is supported thereby.
Figure 2:
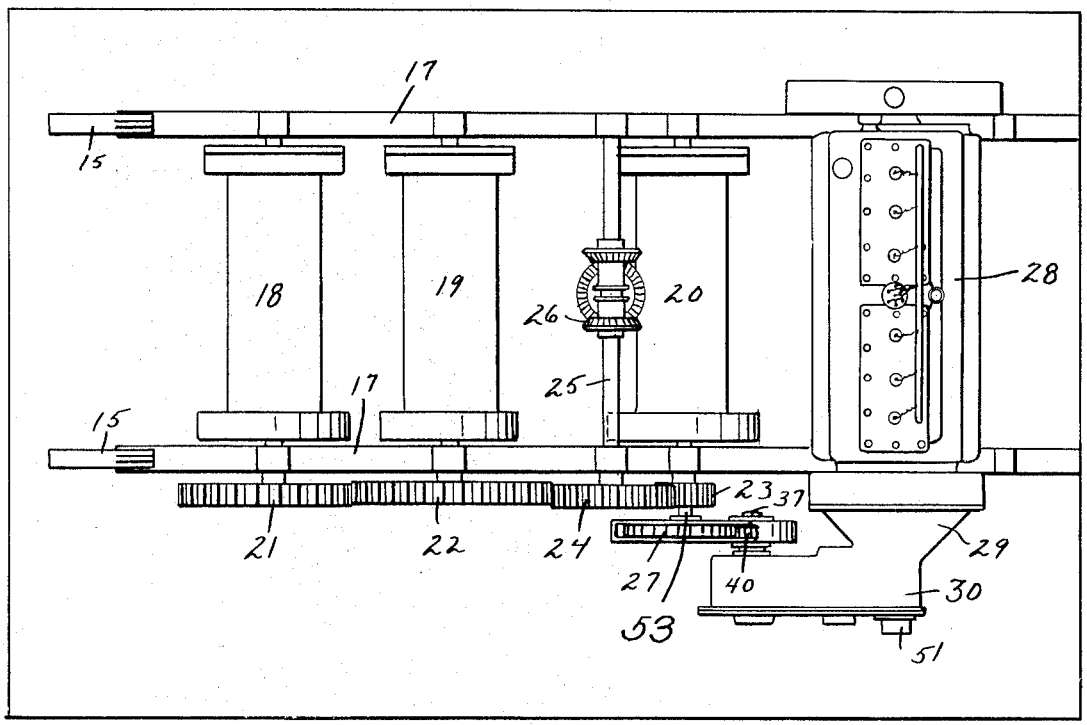
Figure 2 is a plan view of the same.

Referring to the accompanying drawings, I have used the numeral 10 to indicate a portable truck having an annular track 11 on its upper end designed to rotatively support the platform 12 by means of suitable wheels 13, designed to travel on said track. Said platform 12 is rotatively mounted about a pivot 14.

The forward end of the platform 12 is provided with a bracket 15 for pivotally supporting the lower end of a boom 16 of ordinary construction.

The platform 12 is provided with parallel frame members 17 supported longitudinally of the platform and substantially equidistant from each side of the longitudinal center of said platform.

Supported by the frame members 17 are cable drums 18, 19 and 20. The drums 18 and 19 are operatively connected by gears 21 and 22, carried by suitable shafts for supporting the drums in the usual manner. The drum 20 is operated by a gear 23 connected with the gear 22 by means of an intermediate gear 24 supported by a shaft 25 having gear mechanism 26 for swinging the platform. The gear 23 is mounted on a shaft 53 on which the drum 20 is carried. The outer end of the shaft 53 is provided with a gear 27 which provides means for operating the mechanism above described.

Supported on the back of the platform and adjacent to the rear end of the frame supporting the drum mechanism above described is an engine 28 arranged transversely with the longitudinal axis of the platform. The ends of said engine terminate substantially within the sides of the frame member 17. The end of the engine opposite the gear 23 is provided with a clutch casing 29, which is sometimes called the bell casing, and is provided with an outwardly extending portion 30 designed to receive a bearing 31 in which a clutch controlled and operated shaft 32 is rotatively mounted. The inner end of the shaft 32 is provided with the usual clutch mechanism not illustrated.

The outer end of the shaft 32 is designed to project outwardly beyond the end of the bearing 31 and designed to support a pinion gear 33 supported within the outer end of the portion 30. One side of the member 30 terminates in a laterally extending gear casing 34, in which is mounted my improved transmission mechanism. The outer end of the gear mechanism is provided with a flange 35 for receiving an end plate 36 detachably mounted, for the purpose of permitting the transmission gears to be assembled.

The casing 34 and the end plate 36 are designed to rotatively support a driven shaft 37 and an intermediate shaft 38, both of which are parallel with the shaft 32. Suitable bearings 39 are provided for supporting said shafts.

The inner end of the shaft 37 projects beyond the casing 34 and toward the longitudinal center line of the machine, and is designed to carry a pinion 40 designed to mesh with the gear 27 above referred to. The outer end of the shaft 38 is provided with a gear 41 rigidly secured thereto and in mesh with the pinion gear 33. The inner end of the shaft 38 is provided with a gear 42 rigidly secured thereto and of smaller diameter than the gear 41. The outer end of the shaft 37 is provided with a loosely mounted gear 43 in mesh with the gear 41 and has its inner hub portion provided with a clutch member 44. The inner end of the shaft 37 is provided with a gear 45 in mesh with the gear 42 and has its inner end of its hub provided with a clutch member 46.

A clutch member 47 is feathered to the central portion of the shaft 37, and has each end provided with a clutch member designed to coact with corresponding clutch members 44 and 46 of the gears 43 and 45, whereby either one of said gears may be operatively connected with said shaft, or whereby when the clutch member is in its central position of movement both of said gears will be operatively disconnected from the shaft. A yoke 48 is provided for shifting said clutch member 47, which is also of ordinary construction.

The end member 36 is provided with an opening 49 to which the outer end of the shaft 32 extends. Said outwardly extending portion 50 provides means whereby auxiliary mechanism may be operated from the shaft 32 independently of the cable drum mechanism before described. A cap 51 is provided for covering the portion 50 when not used for operating auxiliary mechanism. Said cap is detachably connected by means of bolts 52.

By this arrangement it will be seen that I have provided a very compact variable speed gear mechanism operated from a pinion 33 supported on the outer end of the shaft 32, and located adjacent to the outer end of the bearing member 31.

The entire transmission gear mechanism is supported within an area, one side of which terminates near the outer end of the pinion 33 and between the shaft 32 and the shaft 26 and outside of the gear 23; or, in other words, the space usually occupied by the chain transmission heretofore utilized for transmitting power from the engine shaft to the drum mechanism, so that the entire width of the combined power plant and hoisting mechanism need not be materially increased, and whereby the weight of the variable transmission is kept near the longitudinal center of the platform.

A considerable advantage is gained with my compact and simple construction, inasmuch as an outboard bearing for the outer end of the clutch shaft does not need to be provided together with the expensive and heavy arms for supporting the same, as heretofore has been necessary when variable speed and reduction gear mechanism has been employed for connecting the clutch shaft with the excavator operating mechanism.

It will further be seen that inasmuch as the pinion 33 is smaller than the gears 43 and 45, and that the gear 45 is larger than the gear 43, the shaft 37 will be operated at a lower speed than the shaft 32, and at one speed when the gear 43 is operatively connected with the pinion 33 by the gear 41, and at another speed when the gear 45 is operatively connected with the pinion 33 by the gears 42 and 41, and thereby providing means whereby the bucket operating drums will not only be operated at variable speeds, but also at a speed lower than the engine speed, and thus eliminate gears of large diameters as well as weight and expense in reduction mechanism connecting the boom and drum operating mechanism to the power pinion.

It will also be seen that by extending the shaft 32 beyond the end member 36, means is provided for auxiliary mechanism from the shaft 32 independent of the operation of the shaft 26.

The clutch between the shaft 32 and the engine shaft provides means for throwing said auxiliary mechanism into and out of operative relation with the engine. Said clutch is also under normal working conditions for controlling the variable speed mechanism above described.

By providing the casing body complete in one casting, and having a large bell at the side near one end provided with a flange for bolting it to the engine, and by positioning the power-take-off pinion 40 at the same side of the casing, I have provided a complete unit which needs no other support, and which forms a shield for the pinion 40 and presents a fully enclosed surface without working parts on the side opposite the pinion 40.

I claim as my invention:

A transmission gear comprising a rigid gear casing having a bell shaped flange at the side of the casing near one end and designed to be fixed to an internal combustion engine and to support the entire casing, the outer side of said casing terminating in a bearing housing, a bearing supported in said housing, a shaft extending through said bearing having one end extending through said bell and its opposite end extending beyond said bearing, a pinion fixed to said shaft adjacent to the outer end of said bearing, a shaft in the opposite end of said casing having one end projecting outwardly from the flanged side of said casing, an intermediate shaft, a pair of spaced gears fixed to said intermediate shaft, the outer one of said gears being larger in diameter than the other and in mesh with said pinion, a gear in mesh with each of the last said gears and rotatively mounted on the second shaft, and clutch devices for fixing either of the last said gears to the second shaft, the smaller pinion of the third shaft and its coacting gear being supported in a plane perpendicular to the first shaft and opposite the inner end of said bearing housing.

Des Moines, Iowa, August 15, 1930.

GEORGE T. RONK.